United States Patent

[11] 3,629,702

[72] Inventor Heinz F. Henken
East Northport, N.Y.
[21] Appl. No. 17,833
[22] Filed Mar. 9, 1970
[45] Patented Dec. 21, 1971
[73] Assignee Hazeltine Corporation

[54] AUTOMATIC TESTER FOR A PLURALITY OF DISCRETE ELECTRICAL COMPONENTS SUPPLIED IN A REPETITIVE PREDETERMINED SEQUENCE
6 Claims, 4 Drawing Figs.

[52] U.S. Cl. .................................................. 324/73 AT, 209/81, 324/158 F
[51] Int. Cl. .................................................. G01r 15/12
[50] Field of Search ........................................ 209/81; 324/73, 73 AT, 188 F

[56] References Cited
UNITED STATES PATENTS
1,957,222 5/1934 Mershon ...................... 209/81

OTHER REFERENCES
Podolsky, Electronics in Resistor Manufacturing Electronics, July 1933, 209- 81

*Primary Examiner*—Herman Karl Saalbach
*Assistant Examiner*—Paul L. Gensler
*Attorney*—Edward A. Onders

ABSTRACT: Disclosed is an automatic component tester which accepts a plurality of supplied electronic components arranged in a repetitive predetermined sequence and compares them to a reference sequence of corresponding sample components. The apparatus includes a motor-driven mechanism for accepting a conveyor of such supplied components and advancing both conveyors through an inspection station such that the components pass therethrough in pairs. Further included in a comparison circuit, which is momentarily connected to each pair of components as it passes through the inspection station and which provides an output indication whenever a selected difference in the electrical characteristics of a supplied and a reference component is detected.

AUTOMATIC TESTER FOR A PLURALITY OF DISCRETE ELECTRICAL COMPONENTS SUPPLIED IN A REPETITIVE PREDETERMINED SEQUENCE

This invention relates to an apparatus for automatically checking the electrical characteristics of a plurality of sequenced discrete electronic components such as resistors, capacitors, diodes and inductors. The invention has general applications in any situation where it is desired to check such components but it is particularly useful for checking sequenced components in a printed circuit board (herein called PCB) assembly process.

In one common PCB assembly process a sequencing apparatus arranges the components on a suitable conveyor in a repetitive predetermined sequence and insertion apparatus such as a "Dynasert," accepts the sequenced components and inserts them into apertures on an incomplete PCB. The component sequence is predetermined and corresponds to the required component arrangement for a specific PCB, so that for each repetition of the component sequence a separate PCB is assembled.

In the above assembly process it is highly desirable to perform a final check of the components on the conveyor after they have been sequenced, but before they are inserted into the PCB, because once assembly is completed, troubleshooting for faulty or incorrectly placed components is a time-consuming and difficult task. Heretofore, such a final check has been performed by a visual inspection of the components and their markings (i.e. color codes) to determine that the components are of the proper type and value and in the proper sequence. In addition to this being a slow, tedious operation, subject to human error, in reading the markings it does not provide the visual inspector with any information as to the actual electrical characteristics of the components. Thus faulty components would still be inserted into the PCB and require subsequent troubleshooting. Furthermore, if diodes are included in the sequenced components the necessary requirement for a visual check of their polarity would make the inspector's too laborious to be practical in most commercial applications.

It is therefore an object of the invention to provide a component tester capable of automatically checking the electrical characteristics of a plurality of discrete electronic components arranged in a repetitive predetermined sequence.

It is a further object of the invention to provide such a tester capable of checking a wide variety of sequenced components by comparing them to a closed loop reference sequence.

It is still further object of the invention to provide such a tester capable of accepting a conveyor of such components from a sequencer, and for supplying the conveyor to a "-Dynasert" after the components have been checked.

In accordance with the invention an apparatus for checking the electrical characteristics of a plurality of discrete electronic components which are supplied in a repetitive predetermined sequence, includes a reference sequence of sample components arranged in an order which corresponds to the predetermined sequence. The apparatus further includes means for accepting the supplied components and the reference components and for advancing supplied and reference components through an inspection station. As the components are advanced through the inspection position the electrical characteristics of a supplied component are compared to the electrical characteristics of a corresponding reference component and an output indication is provided whenever a selected difference between the electrical characteristics of the supplied and reference components are detected.

For a better understanding of the present invention, together with other and further objects thereof, reference is had to the following description taken in connection with the accompanying drawing and its scope will be pointed out in the appended claims.

DESCRIPTION AND OPERATION

Figure 1:
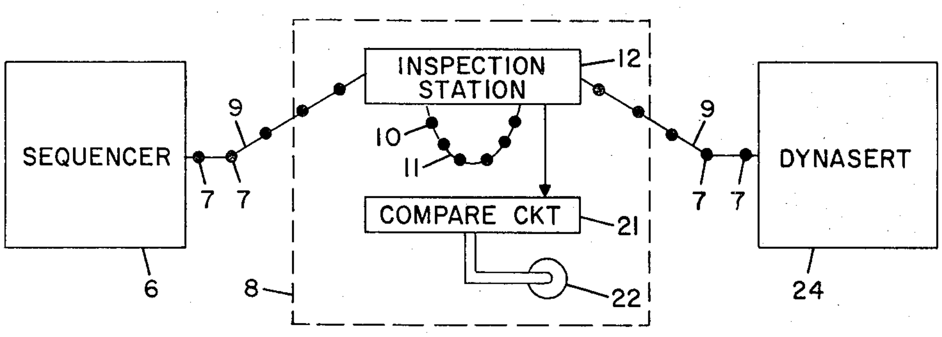
FIG. 1 is a block diagram which shows an automatic component tester constructed in accordance with the invention in combination with a prior art sequencer and "Dynasert" apparatus.

Referring now to the drawings, a specific application for which the novel automatic component tester of the present invention is particularly appropriate, is shown in FIG. 1. Sequencer 6 is well known apparatus which places a plurality of discrete electronic components, such as resistors, capacitors, diodes, inductors, etc., into a repetitive predetermined sequence. The actual sequence is predetermined according to the intended use of the components; one example of this being a sequence which corresponds to the number and type of components which are to be inserted in a specific PCB as previously described. The sequenced components 7 are supplied from unit 6 to the component tester 8 by any convenient means such as the conveyor 9 which may be a conventional conveyor belt, adhesive tape, or other movable ribbon of material. It is not necessary that conveyor 9 be fed directly to tester 8 as shown in FIG. 1, since it may prove useful to store the sequenced components (for example on reels) and to perform the testing operation at a later time. After testing, the components may be supplied to a utilization apparatus, such as Dynasert 24, which accepts the sequence components and inserts them into PCB as previously described. A reference sequence consisting of sample components 10, arranged in an order which corresponds to the predetermined sequence is shown arranged on a reference conveyor 11. The reference sequence is utilized as a standard against which the supplied sequenced components can be compared. Thus, sample components of known values are arranged to correspond in number, order, and type to the components in the supplied sequence.

Figure 2:
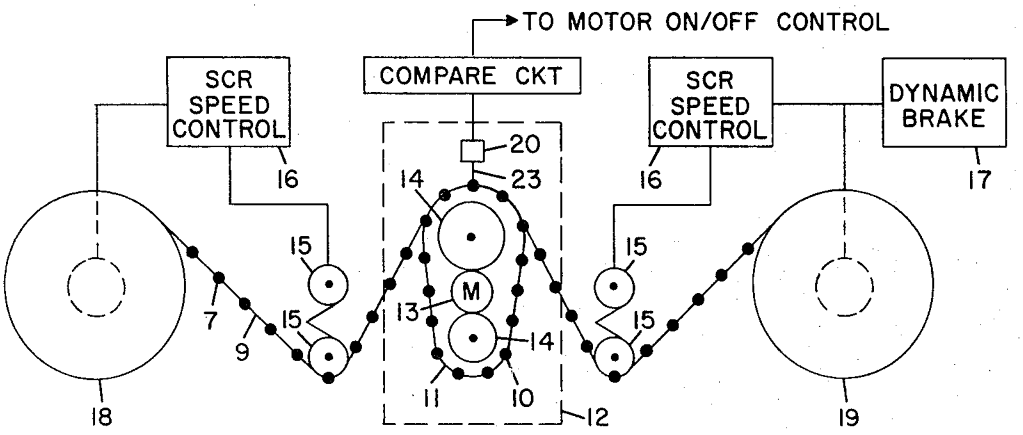
FIG. 2 is a diagram showing an embodiment of an automatic component tester constructed in accordance with the invention.

Referring now to FIG. 2 in accordance with the invention reference component conveyor 11 is arranged in a closed loop to form an endless conveyor thereby enabling a single reference sequence to be used continuously as a standard for a large number of supplied components as long as they are repetitively arranged in the same predetermined sequence, which is normally the case where many identical PCBs are being assembled. Although any suitable components arranged in the predetermined sequence can be employed as a reference sequence, a highly inexpensive and expedient method for obtaining such a reference sequence is to utilize the first predetermined sequence of components supplied from the sequencer. For example if the sequencer supplies a tape of components, the initial portion of the tape having a single predetermined sequence thereon can be cut off and spliced to form a closed loop. The closed loop thusly formed is well suited for use as a reference component conveyor since each resistor, capacitor, and diode on the loop inherently corresponds to a like resistor, capacitor and diode in the subsequent repetitive predetermined sequence on the supply conveyor. A second advantage in using such a reference conveyor is that the advancing means hereinafter described are simplified to a great extent when the type of conveyor and the spacing between components on each conveyor are identical for the supply and reference conveyors. To increase testing accuracy the cut portion of the tape, which now contains reference components, may be subjected to the prior art visual check which may include a voltohmeter (VOM) check of the electrical characteristics of each component to determine their suitability as a reference standard.

Figure 3:
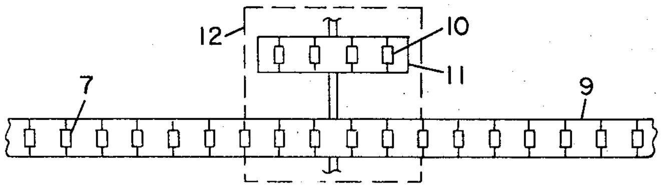
FIG. 3 is a partial plan view of the embodiment of FIG. 2 which shows the alignment of the supply and reference component conveyors in the inspection station.
Figure 4:
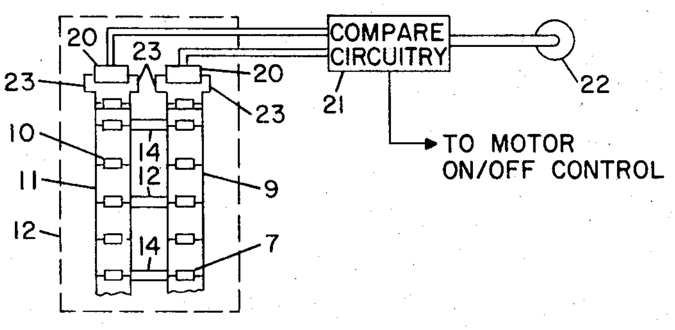
FIG. 4 is a partial view of a portion of the inspection station of the embodiment of FIG. 2 in which the positioning of test boards in relation to the supplied and reference components is illustrated.

Also included in the component tester 8 is means for accepting the supplied components and the reference components and for advancing a supplied component and a corresponding reference component through an inspection station 12. This means may consist of a motor-driven conveyor system such as is illustrated in the specific embodiment of FIG. 2. A stepping motor 13 is adapted through rollers 14 and other suitable gearing mechanisms well known in the art of synchronously advance supply conveyor 9 and reference conveyor 11 in discrete steps through inspection station 12. Referring to FIG. 3 which is a plan view of a top portion of the FIG. 2 embodiment, the one-for-one alignment between supplied components and the corresponding reference components, as they are advanced through the inspection station, can be clearly seen. Such alignment although not necessary, greatly facilitates the gearing and guidance systems required to properly advance the two conveyors. Rollers 15, speed controls 16, and dynamic brake 17 are employed in combination with other elements not illustrated, but well known to the art, to provide a conveyor system which is responsive to and controlled by stepping motor 13. For convenience, the supply conveyor 9 originates from a feed reel 18 and collected on a takeup reel 19, either or both of which may be motor driver.

Test heads 20 are provided in the inspection station 12 to enable the compare circuit 21 hereinafter described, to be momentarily connected to each pair of components (a supplied component and a corresponding reference component) as they are advanced through the inspection station. The test heads may employ wiper contacts 23, for example, which are traversed by the axial leads of each pair of components thereby providing a momentary connection between the components and the compare circuit 21.

In order to determine if each of the supplied components is of the correct type, value and polarization, the invention includes means for comparing the electrical characteristics of a supplied component with those of a corresponding reference component and for providing an output indication whenever a selected difference between these characteristics is detected. For this purpose a compare circuit 21 is employed in the embodiment illustrated in the drawings. Compare circuit 21 may be any one of several suitable electronic circuits well known in the art, such as a balanced bridge, in which case each pair of components being tested serve as two legs of the bridge. If the components' electrical characteristics differ by more than a selected amount, it is detected by the amount of unbalance it creates in the bridge circuit, and an output indication such as a specific current flow can be produced. The output indication may be used to light an indicator lamp 22 and/or to trigger and on/off control for stepping motor 13, as shown in FIG. 2 thereby stopping the comparison process from continuing until an operator takes corrective measures, such as by replacing the defective component and resetting the apparatus.

In this manner a large number of supplied components can be automatically tested at high speeds with little or no assistance from an operator unless a component failure is detected.

While there has been described what is at present considered to be the preferred embodiment of this invention, it will be obvious to those skilled in the art that various changes and modifications may be made therein without departing from the invention and it is, therefore, aimed to cover all such changes and modifications as fall within the true spirit and scope of the invention.

What is claimed is:

1. Apparatus for checking the electrical characteristics of a plurality of discrete electronic components, which are supplied on a supply conveyor in a repetitive predetermined sequence, comprising:

a reference sequence of sample components arranged on an endless reference conveyor like in kind to the supply conveyor in an order which corresponds to said predetermined sequence:

means for accepting said supplied components and said reference components and for advancing said supplied and reference components through an inspection station;

and means for comparing the electrical characteristics of a supplied component with those of a corresponding reference component as said components are advanced through said inspection station for providing an output indication whenever a selected difference between the electrical characteristics of said supplied and reference components are detected during comparison.

2. Apparatus in accordance with claim 1, wherein said means for providing an output indication includes apparatus for prohibiting further comparisons when said selected difference is detected.

3. Apparatus for checking the electrical characteristics of a plurality of discrete electronic components supplied on a supply conveyor in a repetitive predetermined sequence, comprising:

a reference sequence of sample components arranged on an endless reference conveyor like in kind to said supply conveyor in an order which corresponds to said predetermined sequence:

means for accepting said supply conveyor and said reference conveyor and for advancing each in discrete steps through an inspection station, such that a pair of components consisting of a supplied component and a corresponding like reference component is presented to said inspection station for each step;

and means for comparing the electrical characteristics of each of said pairs as they are advanced through said inspection station for providing an output indication whenever a selected difference between the electrical characteristics of a supplied and reference component is detected during comparison.

4. Apparatus in accordance with claim 3, wherein said endless reference conveyor consists of a portion of said supply conveyor having a single predetermined sequence of supplied components thereon, said portion being formed into a closed loop such that each component on said reference conveyor corresponds to like components in the predetermined sequence on said supply conveyor.

5. Apparatus in accordance with claim 4, wherein said accepting means includes a stepping mechanism adapted to synchronously advance both said reference conveyor and said supply conveyor.

6. Apparatus for checking the electrical characteristics of a plurality of discrete electronic components supplied on a supply conveyor in a repetitive predetermined sequence, comprising:

a reference sequence of components consisting of a portion of said supplied conveyor having a single predetermined sequence of components thereon, said portion being formed into a closed loop reference conveyor such that each component on said reference conveyor corresponds to a like component in the predetermined sequence on said supplied conveyor:

means, including a stepping motor, for accepting said supplied conveyor and for synchronously advancing each in discrete steps through an inspection station, such that a pair of components consisting of a supplied component and a like reference component is presented to said inspection station for each step;

circuit means for comparing the electrical characteristics of each of said pairs as they are advanced through said inspection station and for providing an output indication whenever a selected difference between the electrical characteristics of a supplied and a reference component is detected during comparison;

and means, responsive to said output indication, for stopping said motor thereby prohibiting further comparison upon detection of said selected difference.

* * * * *